United States Patent [19]

Fletcher et al.

[11] 3,760,239

[45] Sept. 18, 1973

[54] COAXIAL INVERTED GEOMETRY TRANSISTOR HAVING BURIED EMITTER

[76] Inventors: James C. Fletcher, Administrator of the National Aeronautics and Space Administration with respect to an invention of; Ronald J. Hruby, Campbell; Steven B. Cress, Hacienda Heights; William R. Dunn, San Jose, all of Calif.

[22] Filed: June 9, 1971

[21] Appl. No.: 151,412

[52] U.S. Cl. ...................... 317/235 R, 317/235 WW

[51] Int. Cl. ............................................. H011 9/00

[58] Field of Search ............................ 317/235, 40.1

[56] References Cited

UNITED STATES PATENTS

| | | | |
|---|---|---|---|
| 3,631,311 | 12/1971 | Engbert | 317/235 R |
| 3,504,243 | 3/1970 | New et al. | 317/235 |
| 3,502,951 | 3/1970 | Hunts | 317/235 |
| 3,483,446 | 12/1969 | Van Der Leest | 317/235 |

*Primary Examiner*—John W. Huckert
*Assistant Examiner*—E. Wojciechowicz
*Attorney*—Armand G. Morin, Sr., Darrell G. Brekke and John R. Manning

[57] ABSTRACT

The invention relates to an inverted geometry transistor wherein the emitter is buried within the substrate. The transistor can be fabricated as a part of a monolithic integrated circuit and is particularly suited for use in applications where it is desired to employ low actuating voltages. The transistor may employ the same doping levels in the collector and emitter, so these connections can be reversed.

8 Claims, 16 Drawing Figures

RONALD J. HRUBY
STEVEN B. CRESS
WILLIAM R. DUNN
INVENTORS

BY
Armand G. Morin Sr.
ATTORNEY

RONALD J. HRUBY
STEVEN B. CRESS
WILLIAM R. DUNN
INVENTORS

BY
Armand G. Morin Sr.
ATTORNEY

RONALD J. HRUBY
STEVEN B. CRESS
WILLIAM R. DUNN
INVENTORS

BY
Armand G. Morin Sr.
ATTORNEY

RONALD J. HRUBY
STEVEN B. CRESS
WILLIAM R. DUNN
INVENTORS

BY

Armand G. Morin Sr.
ATTORNEY

RONALD J. HRUBY
STEVEN B. CRESS
WILLIAM R. DUNN
INVENTORS

BY
Armand G. Morin Sr.
ATTORNEY

RONALD J. HRUBY
STEVEN B. CRESS
WILLIAM R. DUNN
INVENTORS

BY Armand G. Morin Sr.

ATTORNEY

COAXIAL INVERTED GEOMETRY TRANSISTOR HAVING BURIED EMITTER

The invention described herein was made in the performance of work under a NASA contract and is subject to the provisions of Section 305 of the National Aeronautics and Space Act of 1958, Public Law 85-568 (72 Stat. 435, 42U.S.C. 2457).

BACKGROUND OF THE INVENTION

1. Field of the Invention:

Transistor structure in integrated circuits.

2. Description of the Prior Art:

Transistor structures in integrated circuits are well known but in the past such transistor circuits have required relatively high actuating voltages. For instance, diffused integrated circuits ordinarily require about five volts for their operation and saturation voltages are on the order of 1.5 volts. In many instrumentation operations, such as biological implant telemetry, wind tunnel telemetry, wireless remote monitoring, and other battery-powered applications, it is common to use a battery voltage of only 1.35 volts. Known transistor structures are not suitable for applications where only very low voltages are available or desirable.

In the past, such integrated circuit transistors have been made with the emitter on top. The devices of the present invention differ primarily from prior-art devices in that the collector is on top and the emitter is buried in the substrate, and the base connection, emitter, and collector are coaxial.

SUMMARY OF THE INVENTION

The primary object of the present invention is to provide a monolithic integrated circuit transistor which is relatively easy to fabricate by known integrated circuit techniques but which will operate at much lower voltages and at higher current gains than integrated circuit transistors heretofore known. For instance, transistors can be made in accordance with the present invention with a collector-emitter saturation voltage which does not exceed 5 millivolts. Such transistors can operate at microampere current levels with current gain in the hundreds.

It is also possible to make transistors according to the present invention which operate with very low leakage current. One series of transistors fabricated in accordance with the present technique operated at voltages as low as 1.0 to 1.4 volts. The saturated collector-emitter voltage $V_{ce(SAT)}$ was on the order of about 5 millivolts and leakage currents less than 0.9 nanoamperes. Thus, such transistors are entirely practical for use at very low battery voltages such as a single mercury cell which is frequently used for biological implants.

The lowest voltage transistors made in accordance with the present invention are able to operate at full scale from extremely low voltage sources such as thermocouples, piezoelectric devices, or wireless induction.

Since the transistors of the present invention operate at very low voltages, diffused integrated microcircuits are possible with component densities of $10^3$ times greater than the present discrete component transistor systems if operated with available batteries.

Since the transistors of the present invention are of coaxial construction, by employing equal doping levels in the collector and emitter, bilateral symmetry is obtained so that the collector and emitter connections can be reversed with high current gain in both directions.

In accordance with the present invention, the emitter is diffused before the collector so that the emitter, which has a low resistance, has a long path and the collector, which has a high resistance, has a short path. This inverted geometry also gives a high stable current gain. It does not require isolation diffusion for grounded emitter amplifiers and lends itself to emitter-coupled grounded emitter amplifiers without isolation diffusion utilizing complementary NPN-PNP transistors.

The transistors of the present invention have a central coaxial base which extends through the collector. The action through the transistor is mostly vertical.

In some embodiments of the invention, the collector and emitter are both equally and uniformly doped, particularly when it is desired to have a bilateral symmetrical transistor. It is also possible to reduce the collector dopant level below that of the emitter in order to increase the breakdown voltage and decrease the base-width modulation effects. Such devices with unequal dopant levels lack bilateral symmetry but operate bilaterally with good gain in both modes.

In accordance with the present invention, various methods of isolation between adjacent devices can be used. In a preferred embodiment of the invention, junction isolation is employed; while in other embodiments dielectric isolation, using silicon dioxide, may be employed. In another embodiment of the invention, the devices can be electrically isolated from each other by etching channels between the active devices (etch-oxide isolation). In still another embodiment of the invention, particularly suitable when higher voltages are employed with etch-oxide isolation, the emitter connection is not brought out at the top surface of the transistor but is connected below the surface for greater isolation from the collector.

DESCRIPTION OF THE PREFERRED EMBODIMENTS

Figure 1:
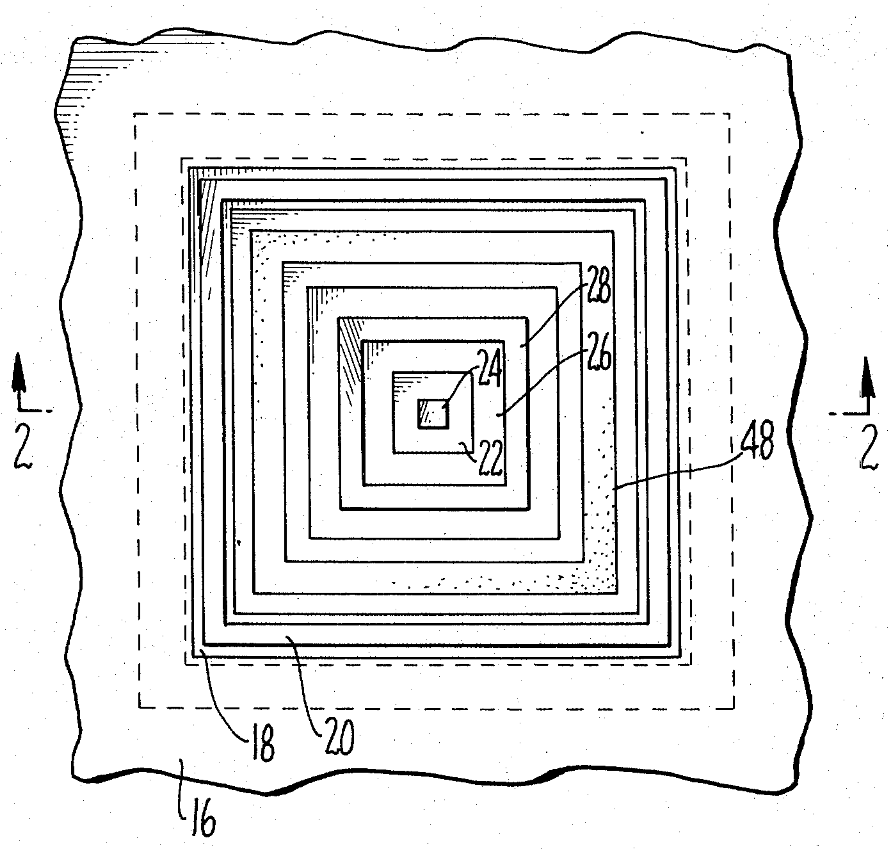
FIG. 1 is a plan view of a transistor embodying the present invention wherein junction isolation is employed.
Figure 2:
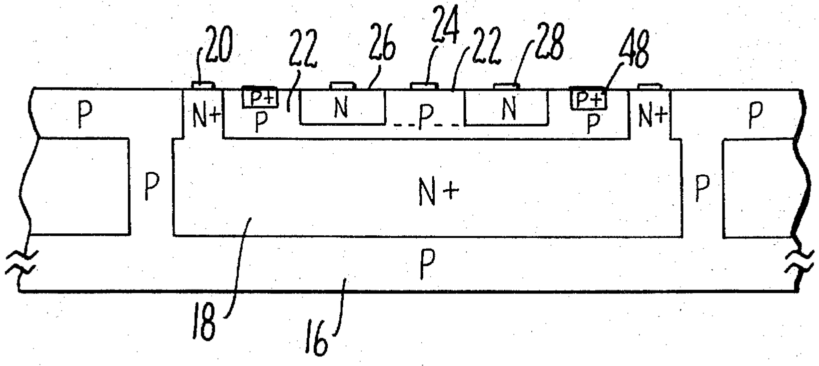
FIG. 2 is a sectional view of the transistor on the line 2—2 of FIG. 1.
Figure 3:
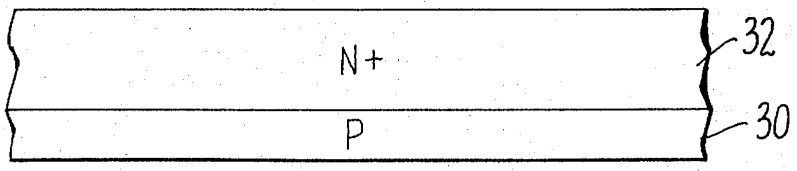
FIGS. 3 through 7 are step-by-step diagrams showing the method of making the transistors shown in FIGS. 1 and 2.

FIGS. 1 and 2 show a preferred embodiment of the present invention, while FIGS. 3 through 7 show the method of fabricating such a transistor. In this embodiment of the transistor, an NPN structure is illustrated and will be described, although it will be obvious to those skilled in the art that the transistor might be a PNP.

The substrate consists of a single crystal of P type silicon 16 and this can suitably be from 5 to 10 mils in thickness. On top of this is an epitaxial layer which has been doped to the N plus condition 18 and this is suitably about 10 microns thick. This forms the submerged emitter which constitutes the crux of the present invention. An emitter connector is provided at 20. Above this is a P doped layer 22 which constitutes the base and this has a base connection at 24. The collector consists of a coaxial square 26 of an N doped material having a connector contact 28. It will be seen that in this embodiment of the invention the substrate material 16 extends to the surface and completely surrounds the transistor structure so that the transistor is effectively isolated from adjacent devices on the same chip.

This method of fabricating the structure will now be described in detail. For clarity, different numbers are used in these fabrication diagrams to avoid confusion where changes are made before the final structure is achieved. Further, the substrate layer P is shown much thinner than it actually is since only the upper layers are of interest with respect to the present invention. For instance, in a practical embodiment of the invention, the substrate was on the order of 10 mils in thickness while all of the layers added to the substrate constituted only from 2 to 8 microns.

Figure 4:
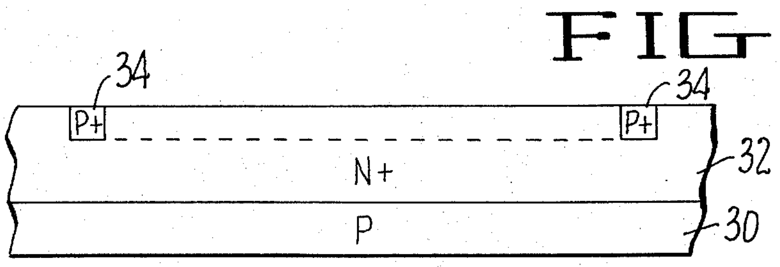
Figure 5:
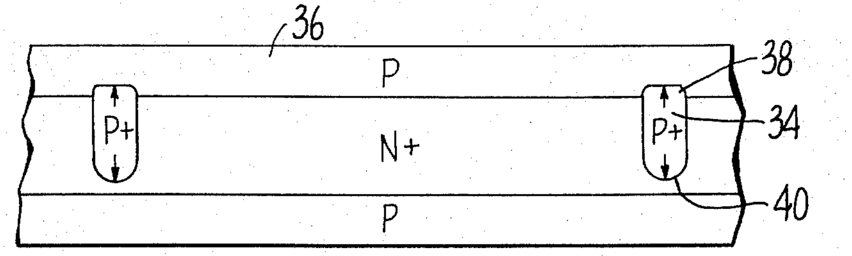
Figure 6:
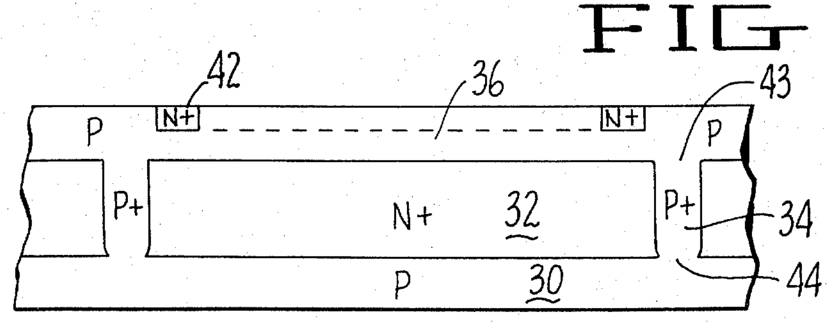
Figure 7:
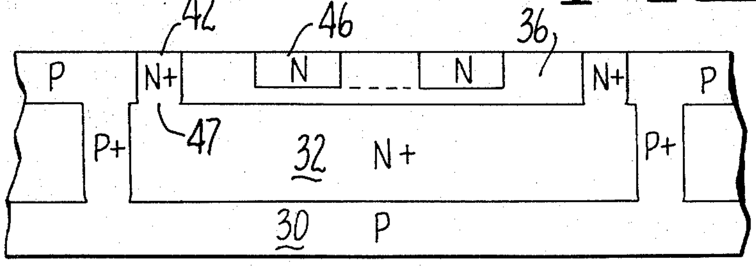

One starts with a suitable P silicon substrate 30 and on this is grown an epitaxial layer 32 of N plus doped material. Next, as is shown in FIG. 4, a P plus isolation deposit is made on the N plus layer as indicated at 34. A second epitaxial P layer 36 is now grown over the original N plus epitaxial layer as is shown in FIG. 5. Also shown in FIG. 5 is the fact that during the growth of the second epitaxial layer, the initial isolation layer 34 diffuses into the new P epitaxial layer as at 38 and also diffuses almost all of the way through the original N plus epitaxial layer as at 40. The N plus layer for the emitter connection is now diffused at 42 and this diffusion causes the P plus isolation layer, previously designated 34, to further diffuse in both directions and to provide a connection with the P epitaxial layer as at 43 and down to the P substrate at 44. This, of course, isolates the P substrate so that no further isolation of the active device from other devices on the same chip is necessary. Now one makes an N diffusion 46 for the collector which also causes the N plus deposit 42 to diffuse to the N plus substrate as at 47. In addition, a P plus channel stop as at 48, FIGS. 1 and 2, may be diffused into base 22. If desired, an $SiO_2$ insulating strip may be laid down over channel stop 48 and the immediately adjacent PN junctions. At this point the transistor is essentially complete and it requires only metalizing contacts thereon, as is well known to those skilled in the art, to complete the structure.

In this embodiment, the substrate was shown as a P material and the first epitaxial layer as N material requiring the second epitaxial layer to be a P material and the first isolation diffusion is a P diffusion and the second isolation diffusion is an N diffusion. This makes the emitter N material, the base P material, and the collector N material. Thus, the transistor is an NPN device. Naturally, the situation could be reversed and the N material could be changed to P and the P to N to provide a PNP transistor if this is desired.

Figure 8:
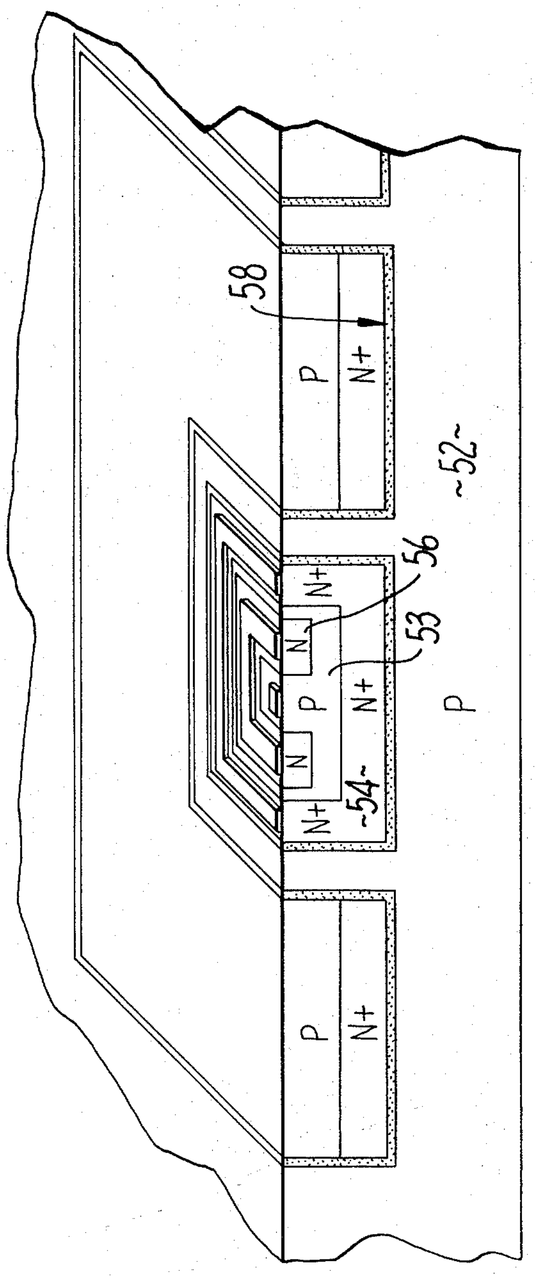
FIG. 8 is a perspective view, partly in section, of a transistor similar to that shown in FIGS. 1 and 2 except that dielectric isolation is employed.

In the embodiment illustrated thus far, junction isolation has been used between adjacent devices such as transistors and diodes. In the embodiment shown in FIG. 8, dielectric isolation has been shown between circuit elements. Dielectric isolation uses less complex diffusion schedules but a different mechanical processing technology. The details of forming this dielectric isolation are not shown because they are standard in the industry. The only difference from conventional practice is that the dielectric isolation uses the original substrate 52 for the base material 53, the epitaxial layer 54 for the emitter, and a diffusion for the collector 56, all as is shown in FIG. 8. The dielectric isolation 58 of silicon dioxide completely surrounds the active device.

Figure 9:
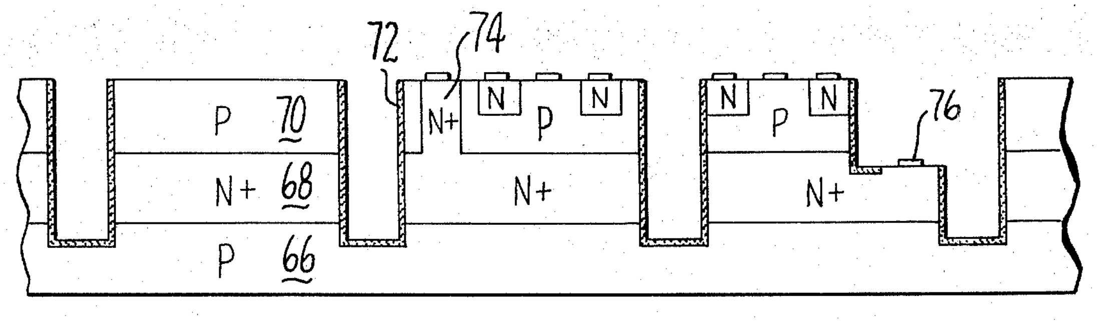
FIG. 9 is a sectional view of a transistor embodying the present invention wherein the circuit elements have been isolated by etching.
Figure 10:
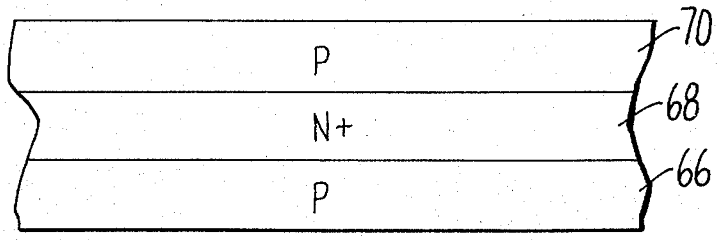
FIG. 10 shows the start of fabrication of a structure by etch isolation wherein two epitaxially grown layers are first formed on the substrate.
Figure 11:
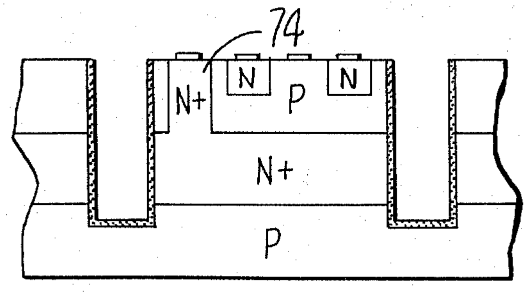
FIG. 11 shows emitter contact in an etch-isolated transistor wherein the contact is made by diffusion.
Figure 12:
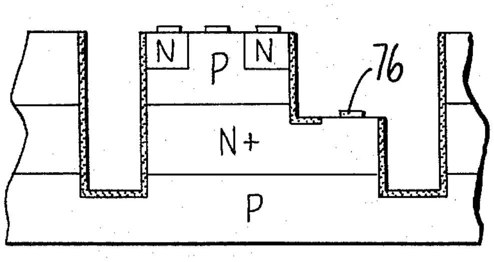
FIG. 12 is similar to FIG. 11 except that emitter contact is by differential etching.

Another method of isolation is to use an oxide layer to separate the pools in the epitaxial layers. This requires only a reverse junction isolation to separate the emitters. Such a transistor is shown in FIG. 9, and suitable methods of fabricating the transistor are shown in FIGS. 10, 11, and 12, FIGS. 11 and 12 showing two different methods of forming the emitter contact. Here, one starts with a P substrate 66 and an epitaxial layer of N plus material 68 followed by a second epitaxial layer of P material 70 which is grown thereon. An N plus deposit 74 is made on the P epitaxial layer for the emitter connection and then each transistor is separated by etching down into the P substrate and isolated by subsequent oxidation to produce a film of $SiO_2$ 72 between the circuit elements. In FIG. 11 the emitter contact is made by diffusion, bringing the N material to the surface as at 74, while in FIG. 12 the emitter contact is made by differential etching as at 76.

The advantage of the etch oxide isolation process lies in the reduction of the reverse biased junction coupling between the collectors and bases of the transistors and the rest of the circuit. Only the emitter is isolated by a reverse bias junction, while the collector and the base as well are isolated by dielectric material. This method has the advantages of dielectric isolation but the ease of conventional fabrication. It also improves high frequency performance and reduces parasitic feedback. This type of isolation makes possible the breadboarding of circuits by conventional methods since there would be a one-to-one correspondence between components in the monolithic circuit and the breadboard.

Figure 13:
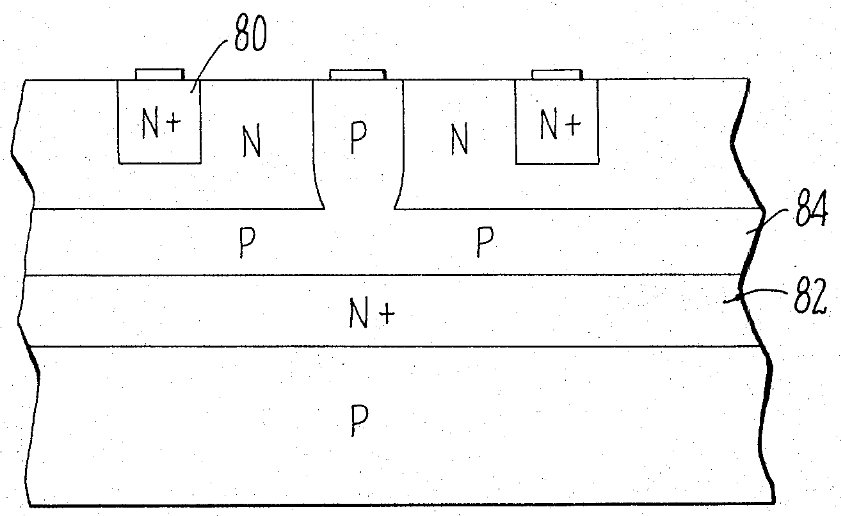
FIG. 13 is a sectional view of another embodiment of the invention, particularly adapted for high voltage application.

In FIG. 13 there are shown the essential features of the transistor of the present invention when one desires to have a transistor with bilateral symmetry. This transistor has a collector 80 and an emitter 82 which are both equally and uniformly doped at $10^{18}$ to $10^{19}$ atoms/cm$^3$. If this is to be an NPN type, antimony would be a suitable dopant, while if it is PNP, boron would be a suitable dopant. The base 84 is doped at a level about $10^{17}$ atoms/cm$^3$. Of course, it is of the opposite conductivity type. The essential feature of this construction shown in FIG. 13 is that a very high gain and low breakdown voltages may be obtained using these impurity dopant levels and the inverted coaxial geometry. Since the dopant level of both the collector and the emitter are equal, the transistor is truly bilateral and the emitter and collector connections can be reversed. The emitter connection is not shown and can be made as described above or can be made through the substrate.

Figure 14:
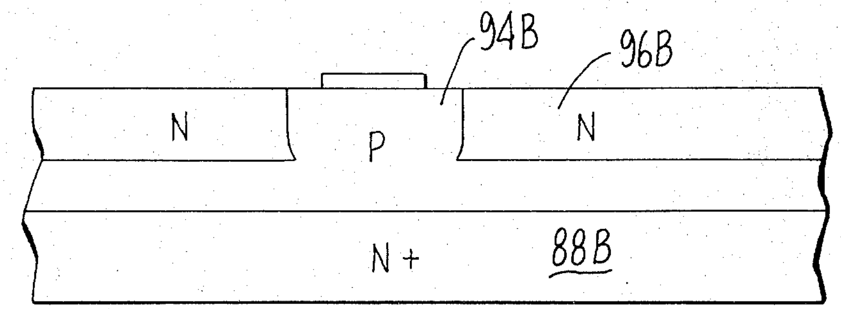
FIG. 14 is a sectional view of a transistor embodying the present invention having bilateral symmetry.
Figure 15:
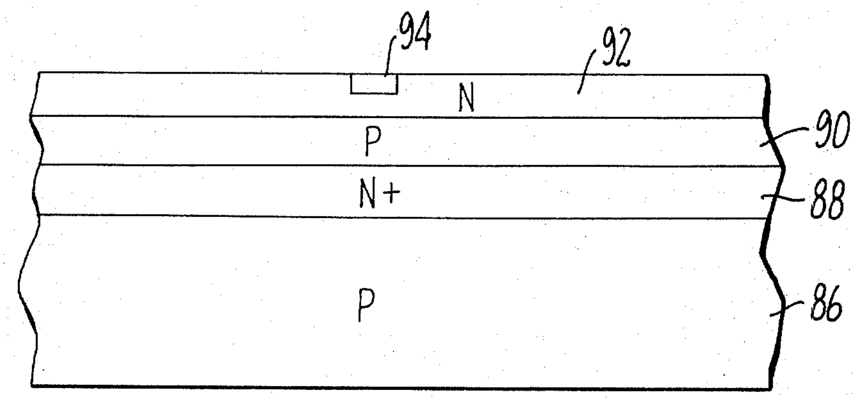
FIGS. 15 and 16 illustrate successive steps in fabricating the structure of FIG. 13.
Figure 16:
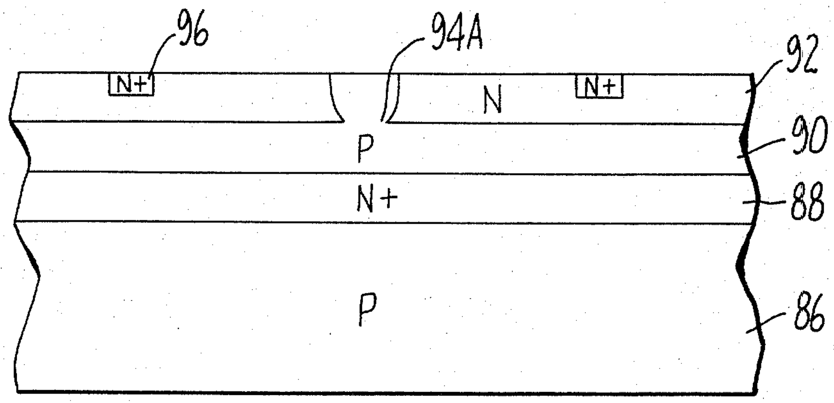

In FIG. 14 a transistor particularly adapted for high voltage with low collector-emitter voltage saturation is shown. FIGS. 15 and 16 show steps in making this transistor. The fabrication starts with a substrate of P material 86 and on this is grown an N plus epitaxial layer 88. A second epitaxial P layer is now grown as at 90. This is followed by a third epitaxial collector N layer 92. A P-type diffusion is now started at 94 and, as is shown in FIG. 16, eventually connects to the P layer as is shown at 94A. Now an N plus diffusion is made at 96 to the N layer to form the collector connection. This produces the transistor shown in FIG. 14 wherein the base connection is shown at 94B, the collector at 96B, and the emitter at 88B. The emitter connection is not shown in this figure but could be made by any of the methods discussed earlier.

The important feature of the present invention is the coaxial nature of the design with the emitter on the outer edges with the base like a bowl with a center stem and pedestal and with the stem protruding through the collector to form the base connector. The effective collector base-emitter depletion region, where minority carriers must traverse, is the pedestal. Practically all of the minority carrier injection from the emitter comes from the bottom of the bowl or pedestal part of the base. The base surrounds the collector and the collector surrounds the base stem as shown and the region of the emitter-collector depletion region has a very high minority carrier injection efficiency.

Part of the base between the emitter and the collector on the surface is covered with an oxide over a suppression ring. The levels of impurity in the emitter and base follow a conventional pattern. In the preferred embodiments of the transistor, the emitter resistivity is about 0.15 ohm-cm. to 0.005 ohm-cm. and the base resistivity is about 0.1 to 0.5 ohm-cm.

The transistors of the present invention have a very high current gain. Even the early models produced gains of from 900 to 3,500. They had a high current gain at a very low current. The small size of the transistor and coaxial construction provide for a very high frequency operation. Units have shown gain bandwidth products in the order of low gigacycles.

In some embodiments of the invention a striking feature of the design is the bilateral characteristic. The collector can be used as an emitter and the emitter can be used as a collector because of the comparable doping level. This has a very distinct advantage in high density microcircuits because it increases the circuit design and layout design freedom.

The reason for these characteristics is twofold. The unique geometry combined with high dopant levels in both the collector and the emitter makes the bilateral operation possible. Also, the high dopant levels significantly improve the base transport factor. This, in turn, provides high current gain. The base transport factor and the current gain are further increased by the favorable effect of the unique transistor geometry on the base spreading resistance. In addition, when an application does not require bilateral operation, a lightly doped collector region may be used permitting higher breakdown voltages and super beta current gains in a unidirectional mode.

We claim:

1. An improved transistor comprising in combination:

a substrate of a semiconductor substance, an epitaxial emitter layer grown on said substrate, said layer being of a first conductivity type, a base layer of a second conductivity type grown as an epitaxial layer on said emitter layer, said base layer having a center arm and a peripheral edge, both extending upwardly and through the top surface of said transistor, a collector of a first conductivity type completely surrounding said arm of the base and extending to said edge of the base, whereby the edge of said base and said collector are coaxial around said arm.

2. The structure of claim 1 wherein said transistor is isolated from other devices on the same substrate by means of a semiconductor material surrounding the emitter and being of the opposite conductivity type from said emitter.

3. The structure of claim 1 wherein said transistor is isolated from other devices on the same substrate by means of a dielectric layer surrounding the emitter.

4. The structure of claim 3 wherein said layer is silicon dioxide.

5. The structure of claim 1 wherein said transistor is isolated from other devices on the same substrate by a gap completely surrounding the edges of the emitter, said gap extending into the substrate.

6. The structure of claim 1 wherein the peripheral edge of the emitter extends to the top surface of the transistor with an emitter contact on said top surface.

7. The structure of claim 1 wherein contact is made to the emitter from the bottom of the substrate.

8. The structure of claim 1 wherein the emitter and the collector are formed by doping the substrate material to the same level whereby the emitter and the collector connections can be reversed.

* * * * *